United States Patent
Kitta

(10) Patent No.: US 10,793,187 B2
(45) Date of Patent: Oct. 6, 2020

(54) STEERING CONTROL APPARATUS OF VEHICLE

(71) Applicant: SUBARU CORPORATION, Tokyo (JP)

(72) Inventor: Kazuki Kitta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 197 days.

(21) Appl. No.: 16/024,727

(22) Filed: Jun. 29, 2018

(65) Prior Publication Data

US 2019/0039648 A1    Feb. 7, 2019

(30) Foreign Application Priority Data

Aug. 7, 2017   (JP) ................................. 2017-152674

(51) Int. Cl.
```
B62D 6/00      (2006.01)
B62D 5/04      (2006.01)
B62D 15/02     (2006.01)
```
(52) U.S. Cl.
CPC .......... *B62D 6/003* (2013.01); *B62D 5/0463* (2013.01); *B62D 15/025* (2013.01)

(58) Field of Classification Search
CPC ..... B62D 15/025; B62D 5/0463; B62D 6/003
See application file for complete search history.

(56) References Cited

U.S. PATENT DOCUMENTS

| 6,711,484 B2 * | 3/2004 | Kifuku | B62D 5/0463 180/443 |
| 7,050,896 B2 * | 5/2006 | Tsuchiya | B60T 8/1755 180/443 |
| 9,604,667 B2 * | 3/2017 | Noh | B62D 5/0487 |

(Continued)

FOREIGN PATENT DOCUMENTS

| JP | 2004-345468 A | 12/2004 |
| JP | 2008013123 A | 1/2008 |

(Continued)

OTHER PUBLICATIONS

Japanese Office Action issued in corresponding Japanese Patent Application No. 2017-152674, dated Apr. 2, 2019, with English Translation.

*Primary Examiner* — Tyler J Lee
(74) *Attorney, Agent, or Firm* — McDermott Will & Emery LLP

(57) ABSTRACT

A steering control apparatus of vehicle includes a target yaw rate calculator, a target torque calculator, and a target torque corrector. The target yaw rate calculator calculates a target yaw rate that allows a vehicle to travel along a traveling course. The target torque calculator calculates target torque that is torque of an electric motor and allows the target yaw rate to be generated. The target torque corrector performs a correction process that calculates a correction gain directed to the target torque and corrects, with the correction gain, the target torque to cause the target torque to be increased. The target torque corrector performs the correction process when (Continued)

an instruction value based on the target torque is varied at a constant rate and on a condition that an absolute value of a motor rotation angle variation amount becomes equal to or less than a set value.

9 Claims, 8 Drawing Sheets

(56) References Cited

U.S. PATENT DOCUMENTS

| | | | | |
|---|---|---|---|---|
| 2003/0069675 A1* | 4/2003 | Kifuku | ................ | B62D 5/0463 |
| | | | | 701/41 |
| 2005/0049769 A1* | 3/2005 | Tsuchiya | ............... | B60T 8/1755 |
| | | | | 701/41 |
| 2015/0183458 A1* | 7/2015 | Noh | .................... | B62D 5/0487 |
| | | | | 701/43 |
| 2018/0001925 A1* | 1/2018 | Lee | .................... | B62D 15/021 |

FOREIGN PATENT DOCUMENTS

| | | |
|---|---|---|
| JP | 2016-064799 A | 4/2016 |
| JP | 2017-088141 A | 5/2017 |

* cited by examiner

STEERING CONTROL APPARATUS OF VEHICLE

CROSS-REFERENCE TO RELATED APPLICATIONS

The present application claims priority from Japanese Patent Application No. 2017-152674 filed on Aug. 7, 2017, the entire contents of which are hereby incorporated by reference.

BACKGROUND

The technology relates to a steering control apparatus of vehicle which is able to control a steering angle by driving a steering mechanism by means of an electric motor.

Some vehicles including automobiles are provided with a steering device, such as an electric power steering (EPS) device. The EPS device is able to control a steering angle by means of an electric motor, independently from steering performed by a driver. For example, the vehicle provided with the steering device performs a steering assist control on the basis of an external environment around the vehicle recognized by a device, such as a camera or a radar device. Non-limiting examples of the steering assist control may include a lane keeping control that keeps a traveling position of the own vehicle within a lane, and a lane departure prevention control that prevents the own vehicle from departing outside the lane. For example, reference is made to Japanese Unexamined Patent Application Publication No. 2016-64799.

SUMMARY

An aspect of the technology provides a steering control apparatus of a vehicle. The steering control apparatus includes: a target yaw rate calculator configured to calculate a target yaw rate, in which the target yaw rate allows a vehicle to travel along a traveling course that is set on a basis of external environment information and traveling information of the vehicle, and the vehicle is able to control a steering angle by driving, with an electric motor, a steering mechanism; a target torque calculator configured to calculate target torque, in which the target torque is torque of the electric motor and allows the target yaw rate to be generated; and a target torque corrector configured to perform a correction process, in which the correction process calculates a correction gain directed to the target torque and corrects, with the correction gain, the target torque to thereby cause the target torque to be increased. The target torque corrector is configured to perform the correction process when an instruction value is varied at a constant rate and on a condition that an absolute value of a motor rotation angle variation amount becomes equal to or less than a set value. The instruction value is a value of instruction to be given to the electric motor and based on the target torque. The motor rotation angle variation amount is an amount of variation in rotation angle of the electric motor.

An aspect of the technology provides a steering control apparatus of vehicle. The steering control apparatus includes circuitry configured to control a steering angle by driving, with an electric motor, a steering mechanism, calculates a target yaw rate, in which the target yaw rate allows a vehicle to travel along a traveling course that is set on a basis of external environment information and traveling information of the vehicle, calculate target torque, in which the target torque is torque of the electric motor and allows the target yaw rate to be generated, and perform a correction process, in which the correction process calculates a correction gain directed to the target torque and corrects, with the correction gain, the target torque to thereby cause the target torque to be increased. The correction process is performed when an instruction value is varied at a constant rate and on a condition that an absolute value of a motor rotation angle variation amount becomes equal to or less than a set value. The instruction value is a value of instruction to be given to the electric motor and based on the target torque. The motor rotation angle variation amount is an amount of variation in rotation angle of the electric motor.

DETAILED DESCRIPTION

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 8:
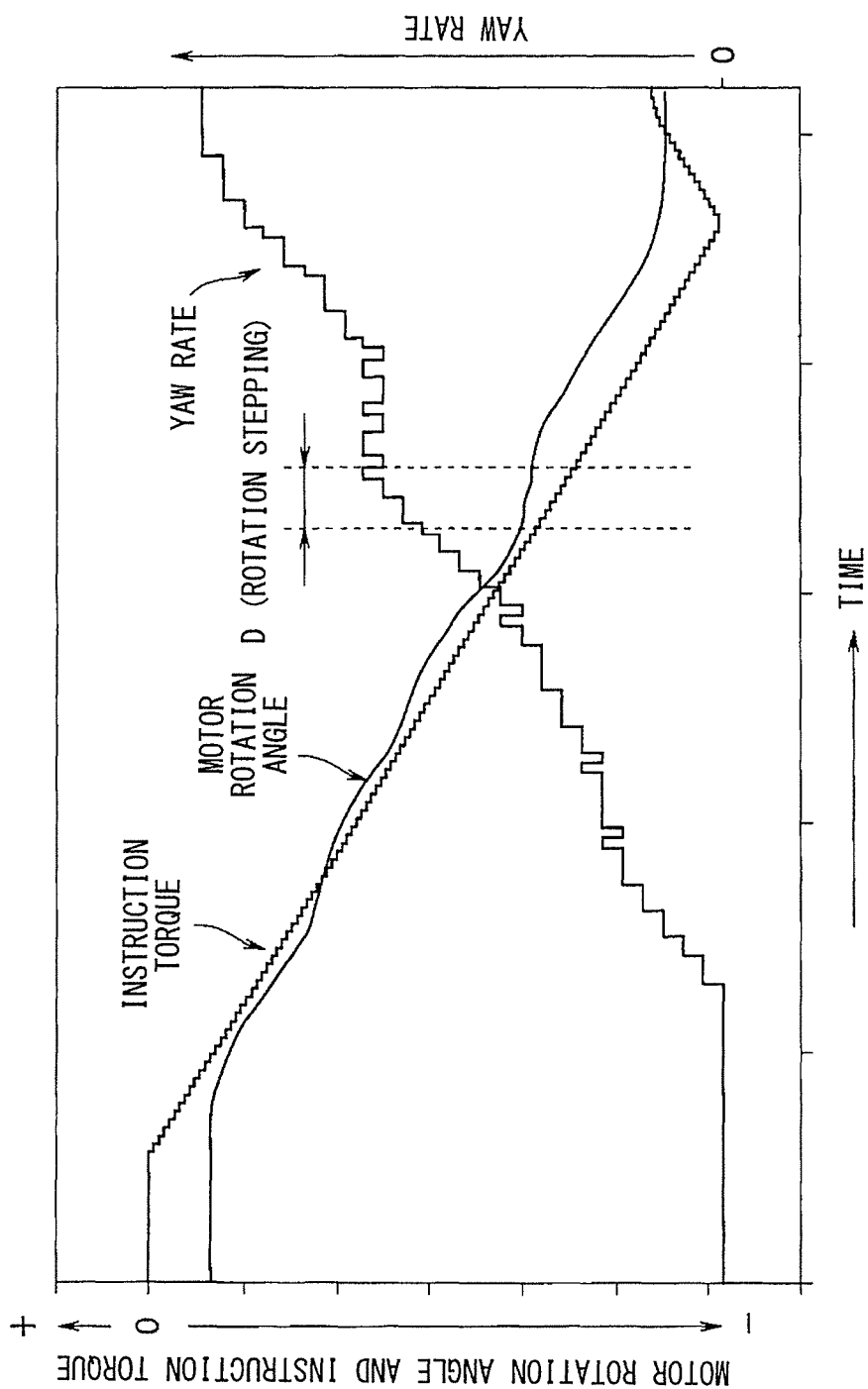
FIG. 8 is a diagram describing an example of a variation in motor rotation angle and a variation in yaw rate both upon turning, according to a comparative example.

Upon performing a control by means of an electric power steering (EPS) device, such as a lane departure prevention control, it is necessary to increase instruction torque of an electric motor to torque higher than torque derived upon a regular steering control to thereby vary a steering angle rapidly. Referring to FIG. 8, in such a control where the torque is relatively high and a speed of steering is high, the instruction torque may sometimes be varied while being limited to a constant rate by a rate limiter. In this case, efficiency of transferring torque from the electric motor to a steering mechanism may possibly fluctuate as can be appreciated from a period denoted by "D" of FIG. 8, possibly leading to an occurrence of "stepping" in which a rotation of the electric motor stops instantaneously or decreases. Hereinafter, the stepping may sometimes be referred to as "rotation stepping". The occurrence of the rotation stepping of the electric motor may possibly result in a situation in which a variation in yaw rate of a vehicle upon turning stops or decreases and increases thereafter, thereby preventing an intended vehicle behavior from being achieved.

It is desirable to provide a steering apparatus of vehicle which is able to prevent rotation stepping of an electric motor resulting from a fluctuation in efficiency of transferring torque from the electric motor to a steering mechanism and thereby achieve an intended vehicle behavior.

Figure 1:
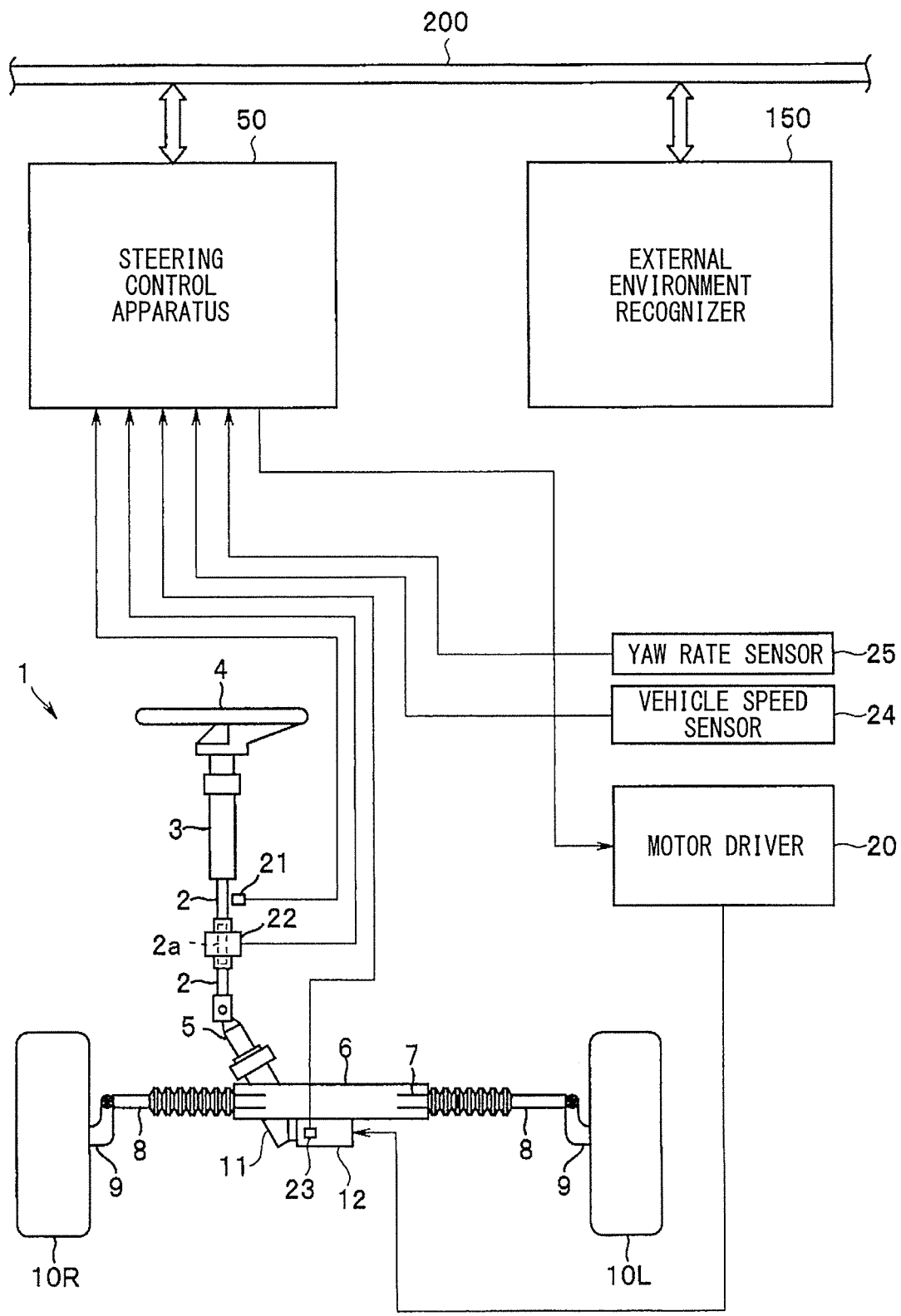
FIG. 1 is a diagram illustrating an example of a configuration of a vehicle steering system that includes a steering control apparatus of vehicle according to one implementation of the technology.

FIG. 1 illustrates an example of a configuration of a vehicle steering system that includes a steering control apparatus of vehicle according to an example implementation of the technology. Referring to FIG. 1, an electric power steering (EPS) device 1 may include a steering shaft 2 pivotably supported by an unillustrated vehicle body frame via a steering column 3. The electric power steering device 1 may be able to control a steering angle by means of an actuator, independently from an input of steering performed by a driver. The vehicle may be, for example but not limited to, an automobile.

The steering shaft 2 may have a first end extending toward a driver's seat and a second end extending toward an engine room. The first end of the steering shaft 2 may be attached with a steering wheel 4. A steering angle sensor 21 may be disposed at an outer circumference of a part of the steering shaft 2 at which the steering wheel 4 is coupled.

For example, the steering angle sensor 21 may include two pairs of magneto-resistive elements. The magneto-resistive elements each may detect a rotation of a magnet provided in a detection gear. The steering angle sensor 21 may detect an angle of rotation (i.e., a steering angle) and a direction of rotation (i.e., a steering direction) both from a fixed reference position, on the basis of a change in magnetism resulting from a rotation of the detection gear. The reference position may be set in advance on the basis of a reference rotation position of the steering wheel 4. For example, the reference rotation position may be a rotation position at the top of the steering wheel 4 where the vehicle runs straight.

A torsion bar 2a may be inserted at a middle part of the steering shaft 2. The second end of the steering shaft 2 may be coupled to a pinion shaft 5. A torque sensor 22 may be disposed at an outer circumference of the torsion bar 2a. The torque sensor 22 may detect steering torque that is based on the steering performed by the driver, through detecting a displacement between the steering wheel 4 side and the pinion shaft 5 side which occurs around the steering shaft 2 by a twist of the torsion bar 2a.

A steering gear box 6 that extends in a vehicle width direction may be disposed in the engine room. The steering gear box 6 may so support a rack shaft 7 that the rack shaft 7 is inserted therethrough and movable in a reciprocating fashion. The rack shaft 7 may be formed with an unillustrated rack that is in engagement with a pinion formed on the pinion shaft 5, structuring a rack-and-pinion steering gear mechanism.

Both ends on the right and left sides of the rack shaft 7 may protrude from respective ends of the steering gear box 6, and each may be coupled to a front knuckle 9 via a tie rod 8. The front knuckle 9 may pivotably support corresponding one of a right wheel 10R and a left wheel 10L that serve as steered wheels, and may be steerably supported by the vehicle body frame. When the steering shaft 2 and the pinion shaft 5 are rotated in response to a driver's operation of the steering wheel 4, the rack shaft 7 moves right and left in accordance with the rotation of the pinion shaft 5. The movement of the rack shaft 7 may cause the front knuckles 9 to pivot around respective unillustrated kingpins to steer the right wheel 10R and the left wheel 10L right and left.

The pinion shaft 5 may be coupled to an electric power steering motor (an EPS motor) 12 via an assist transfer mechanism 11. The EPS motor 12 may be the actuator that allows for an automatic steering and an assist of a steering operation performed by the driver. The assist transfer mechanism 11 may include a reduction gear mechanism such as a worm gear. The EPS motor 12 may be, for example but not limited to, a DC brushless motor that includes a stator fixed to a housing and a rotor rotated inside the stator. In one implementation, the EPS motor 12 may serve as an "electric motor". A rotation of the rotor of the EPS motor 12 as the electric motor may be converted by the assist transfer mechanism 11 into an axial motion of the rack shaft 7.

The EPS motor 12 may include a rotation angle sensor 23 that detects an angle of rotation of the rotor. For example, the rotation angle sensor 23 may detect the angle of rotation, relative to a predetermined zero position, of the rotor on the basis of a device such as a rotary encoder. A signal obtained by the rotation angle sensor 23 may be supplied to a steering control apparatus 50.

For example, the zero position may be initially set for the rotation angle sensor 23 when an ignition is turned on, on the basis of the steering angle detected by the steering angle sensor 21 and a reduction ratio of the assist transfer mechanism 11. Normally, the angle of rotation detected by the rotation angle sensor 23 and the angle of rotation of the steering wheel 4 detected by the steering angle sensor 21 may be handled as the same rudder angle, i.e., the same steering angle.

The steering control apparatus 50 may be a control unit, and mainly include a microcomputer. The steering control apparatus 50 may so control the EPS motor 12 as to drive the EPS motor 12 through a motor driver 20. The steering control apparatus 50 may receive signals from various sensors and unillustrated various switches. Non-limiting examples of the sensors may include the steering angle sensor 21, the torque sensor 22, the rotation angle sensor 23, a vehicle speed sensor 24 that detects a vehicle speed, and a yaw rate sensor 25 that detects a speed of rotation around a vertical axis of the vehicle, i.e., a yaw rate.

The steering control apparatus 50 may be coupled to a communication bus 200 that forms an on-vehicle network. The communication bus 200 may be coupled to control units, including an external environment recognizer 150 that recognizes an external environment of the vehicle and thereby acquires traveling environment information. Besides the external environment recognizer 150, non-limiting examples of the control units to which the communication bus 200 is coupled may include an engine control unit, a transmission control unit, and a brake control unit, each of which is unillustrated. Such control units may be able to exchange pieces of control information with each other through the communication bus 200.

The external environment recognizer 150 may recognize the external environment around the own vehicle, on the basis of pieces of information such as detection information, traffic information, positioning information, road shape data, or map information. The detection information may relate to detection of an object around the own vehicle, and may be obtained by any of various devices such as an on-vehicle camera, millimeter wave radar, or LiDAR. The traffic information may be obtained by an infrastructure communication such as a road-to-vehicle communication or a vehicle-to-vehicle communication. The positioning information may relate to measurement of a position of the own vehicle which is based on a signal obtained from a satellite system such as a global positioning system (GPS) satellite. The road shape data may relate to a shape of a road such as a curvature, a lane width, or a road shoulder width. The map information may be a high-definition map information that includes data directed to traveling control. The traveling control data may include a factor such as an azimuth of a road, a type of a lane line, or the number of lanes.

In an example implementation, the external environment recognizer 150 may recognize a forward environment by means of the on-vehicle camera and an image recognizer. The on-vehicle camera may be a stereo camera including two cameras that capture respective images of the same object from different viewpoints. The cameras structuring the stereo camera each may have an imaging device such as CCD (charge coupled device) or CMOS (complementary metal oxide semiconductor). The cameras may be so controlled that their shutter timings are synchronized with each other, and may be separated away from each other by a predetermined baseline length. For example, the cameras may be disposed near a rear-view mirror on inner side of a windshield, in an upper part of a vehicle interior.

The external environment recognizer 150 may process pieces of image data obtained from the stereo camera in the following example way. First, the external environment recognizer 150 may obtain a shift amount between corresponding positions in the pair of stereo images. The stereo images as a set may be captured by the respective cameras and directed to a traveling direction of the own vehicle. Based on the thus-obtained shift amount, the external environment recognizer 150 may obtain a distance image having distance information.

In recognition of lane lines such as white lines or other colored lines, the external environment recognizer 150 may evaluate a change in luminance in a width direction of a road on the grounds that the lane lines are higher in luminance than a road surface. By performing the evaluation, the external environment recognizer 150 may recognize the right and the left lane lines. The external environment recognizer 150 may thereafter identify positions of the right and the left lane lines on an image plane. Positions in real space (x, y, z) of the lane lines may be calculated by any expression of coordinate transformation, on the basis of the positions (i, j) on the image plane and a parallax calculated from the positions on the image plane, i.e., on the basis of the distance information.

In an example implementation, a coordinate system in the real space, set on the basis of a position of the own vehicle as a reference, may be defined as follows. For example, the vehicle width direction may be defined as an x-axis, a vehicle height direction may be defined as a y-axis, and a vehicle length direction, i.e., a distance direction, may be defined as a z-axis, where the road surface immediately below a position in the midpoint of the stereo cameras is the origin. An x-z plane where y equals to zero (0) is coincident with the road surface when the road is flat. A road model may be expressed by dividing, in the distance direction, a traveling lane on the road on which the own vehicle travels into a plurality of sections, approximating the right and the left lane lines in each of the sections in a predetermined way, and coupling those approximated lane lines together.

A result of the recognition on the external environment performed by the external environment recognizer 150 may be sent to the steering control apparatus 50 and/or any other control unit. The steering control apparatus 50 may execute a steering assist control for a driving assist control that allows for automatic driving of the own vehicle or assists driving performed by the driver. For example, the steering control apparatus 50 may set, on the basis of the result of the recognition on the external environment, a target course as a traveling course along which the own vehicle is to travel, and so execute the steering assist control, by means of the motor driver 20 that drives the EPS motor 12, as to cause the own vehicle to follow and travel along the target course. The steering control apparatus 50 may also output assist torque that assists the steering operation performed by the driver by means of the EPS motor 12, when a steering override based on the driver's steering wheel operation is detected.

The target course upon the steering control performed by the steering control apparatus 50 may be set on the basis of the result of the recognition on the external environment performed by the external environment recognizer 150. For example, upon a lane keeping control that causes the own vehicle to follow along the lane while keeping the own vehicle in the middle of the lane, middle positions in a road width direction between right and left lane lines, such as white lines, may be set as the target course. The steering control apparatus 50 may so set a target steering angle as to cause a central position in the vehicle width direction of the own vehicle to be brought into coincidence with target points on the target course, and may so control a drive current of the EPS motor 12 as to cause the steering angle based on the steering control to meet the target steering angle. It is to be noted that, as an example implementation, the target course may be set by any control unit other than the steering control apparatus 50, such as the external environment recognizer 150.

The steering control apparatus 50 may also execute a lane departure prevention control that controls the steering in a direction by which departure of the own vehicle from the lane is prevented. The steering control apparatus 50 may execute the lane departure prevention control when the steering control apparatus 50 determines, during the steering assist control, that the own vehicle possibly departs from the lane if a current behavior of the own vehicle is maintained due to, for example, an inappropriate steering operation performed by the driver. It is to be noted that, upon the lane departure prevention control, torque of the pinion shaft 5 may possibly fluctuate due to the efficiency of transferring the torque of the EPS motor 12 in the assist transfer mechanism 11, possibly leading to the occurrence of rotation stepping in which the rotation of the EPS motor 12 stops instantaneously or decreases. To suppress or prevent the rotation stepping of the EPS motor 12, the steering control apparatus 50 corrects instruction torque directed to the EPS motor 12 when the lane departure prevention control is in execution and under a predetermined condition.

Figure 2:
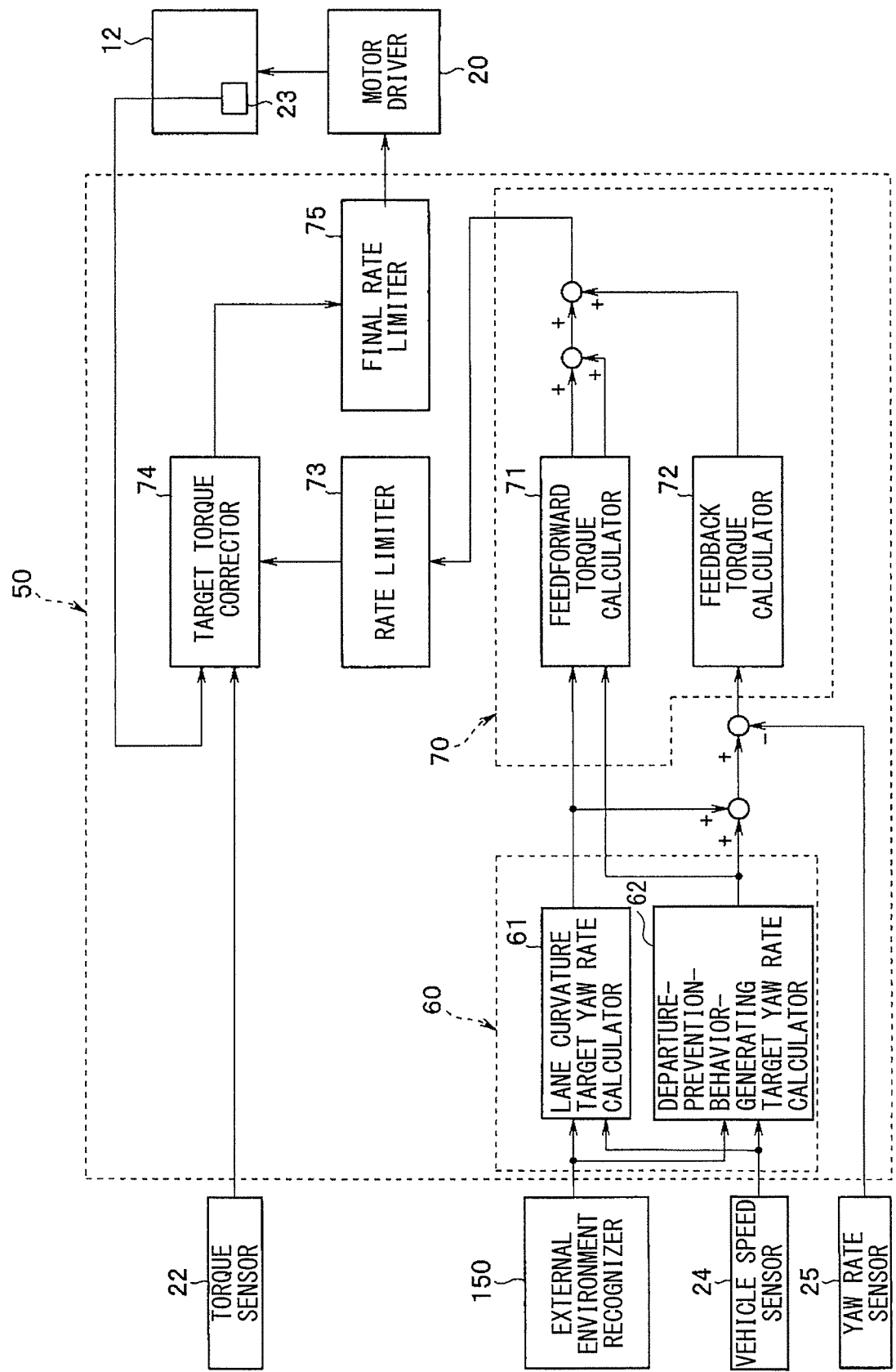
FIG. 2 is a block diagram illustrating an example of a configuration of the steering control apparatus.

The steering control apparatus 50 may include functional units directed to controls including the lane keeping control and the lane departure prevention control. Referring to FIG. 2, in an example implementation, the steering control apparatus 50 includes a target yaw rate calculator 60, a target torque calculator 70, and a target torque corrector 74 as main functional units. The target yaw rate calculator 60 calculates a target yaw rate that allows the own vehicle to travel along the target course. The target yaw rate calculator 60 may calculate the target yaw rate on the basis of a factor such as: the curvature of the lane, a yaw angle of the own vehicle relative to the lane, and/or a lateral position of the own vehicle relative to the lane which are recognized by the external environment recognizer 150; or the vehicle speed of the own vehicle detected by the vehicle speed sensor 24. The target torque calculator 70 calculates target torque. The target torque may form the basis of the instruction torque that allows the target yaw rate to be obtained. The instruction torque is directed to the EPS motor 12, i.e., is a value of instruction to be given to the EPS motor 12. The target torque corrector 74 corrects the target torque. Accordingly, when executing such a steering control that varies the steering angle with relatively high torque, such as when executing the lane departure prevention control, the steering control apparatus 50 corrects the target torque under a predetermined condition, thereby suppressing or preventing the occurrence of the rotation stepping resulting from the fluctuation in the efficiency of transferring the torque of the EPS motor 12 in the assist transfer mechanism 11.

In an example implementation, the target yaw rate calculator 60 may include a lane curvature target yaw rate calculator 61 and a departure-prevention-behavior-generating target yaw rate calculator 62. The lane curvature target yaw rate calculator 61 may calculate a target yaw rate (i.e., a lane curvature target yaw rate) $\gamma$tgt_lane that allows a target turning amount based on the curvature of the lane to be obtained. The departure-prevention-behavior-generating target yaw rate calculator 62 may calculate a target yaw rate (i.e., a departure-prevention-behavior-generating target yaw rate) $\gamma$tgt_turn that allows a target turning amount by which the departure from the lane is prevented to be obtained. Hereinafter, the departure-prevention-behavior-generating target yaw rate is simply referred to as a "behavior-generating target yaw rate".

The lane curvature target yaw rate $\gamma$tgt_lane may be calculated by an example method in which the vehicle speed of the own vehicle is multiplied by a gain. The gain may be set in advance on the basis of a curvature of a lane. The behavior-generating target yaw rate $\gamma$tgt_turn may be calculated by an example method in which the yaw angle, relative to the lane, of the own vehicle is divided by a time until which the own vehicle steps across a lane line (e.g., a white line) of a lane. The time until which the own vehicle steps across the lane line of the lane may be obtained by an example method in which a distance, from the own vehicle to the lane line of the lane positioned in a direction in which the own vehicle departs, is divided by a speed component, based on the yaw angle relative to the lane, of the vehicle speed of the own vehicle.

The target torque calculator 70 may include a feedforward torque calculator 71 and a feedback torque calculator 72. The feedforward torque calculator 71 may calculate feedforward torque that is based on a feedforward control. The feedback torque calculator 72 may calculate feedback torque that is based on a feedback control. The target torque calculator 70 may output, to a rate limiter 73, the target torque in which the feedforward torque and the feedback torque are added.

The feedforward torque calculator 71 may calculate feedforward torque Tp_yawrff lane on the basis of the lane curvature target yaw rate $\gamma$tgt_lane. Further, when there is a possibility of departure of the own vehicle from the lane, the feedforward torque calculator 71 may calculate feedforward torque Tp_yawrff turn on the basis of the behavior-generating target yaw rate $\gamma$tgt_turn. For example, the feedforward torque Tp_yawrff lane and the feedforward torque Tp_yawrff turn may be calculated by an example method in which the lane curvature target yaw rate $\gamma$tgt_lane and the behavior-generating target yaw rate $\gamma$tgt_turn are multiplied by their respective yaw rate/torque conversion gains. The yaw rate/torque conversion gain may be obtained by referring to a previously-created map that defines the yaw rate/torque conversion gains.

The feedback torque calculator 72 may calculate feedback torque Tp_yawrfb that is based on a deviation between a target yaw rate $\gamma$p and an actual yaw rate $\gamma$s. The target yaw rate $\gamma$p may be based on the lane curvature target yaw rate $\gamma$tgt_lane and the behavior-generating target yaw rate $\gamma$tgt_turn. The actual yaw rate $\gamma$s may be an actual yaw rate of the own vehicle detected by the yaw rate sensor 25. For example, the feedback torque Tp_yawrfb may be calculated on the basis of a proportional integral differential (PID) control performed on the deviation ($\gamma$p−$\gamma$s) between the target yaw rate $\gamma$p and the actual yaw rate $\gamma$s.

The rate limiter 73 may receive target torque Tp. The target torque Tp may be obtained as a result of addition of the feedforward torque (Tp_yawrff lane and Tp_yawrff turn) derived from the feedforward torque calculator 71 and the feedback torque Tp_yawrfb derived from the feedback torque calculator 72. The rate limiter 73 may limit a rate of variation in output of the target torque Tp. The target torque Tp in which the rate of variation is thus limited may be supplied to the target torque corrector 74. The target torque corrector 74 may output corrected torque as requested torque. A final rate limiter 75 may receive the requested torque, and output the requested torque as instruction torque T1.

The rate limiter 73 and the final rate limiter 75 each may limit the rate of variation in the output torque by means of a filtering process or any other method. The rate limiter 73 as an initial limiter may mainly suppress the rate of variation in the target torque Tp to a rate that does not give the driver a feeling of strangeness. The final rate limiter 75 may define a limit of a rate of variation in the requested torque in consideration of safety. It is to be noted that, under normal circumstances, the rate of variation in the torque (i.e., the target torque Tp) may be limited by the rate limiter 73 as the initial limiter, and it is less likely that the rate of variation in the torque (i.e., the requested torque) is limited by the final rate limiter 75.

The target torque corrector 74 may calculate a correction gain G_hosei. The correction gain G_hosei may correct the target torque Tp outputted from the rate limiter 73. Further, the target torque corrector 74 may multiply the target torque Tp by the calculated correction gain G_hosei to thereby so correct the target torque Tp as to cause the target torque Tp to be increased. For example, the target torque corrector 74 may so correct the target torque Tp that the corrected torque, i.e., the requested torque, is increased higher than the target torque Tp before the correction. Thus, the torque derived from the multiplication of the correction gain G_hosei (i.e., the target torque Tp×G_hosei) corrects the output torque of the EPS motor 12 in an increasing fashion, preventing the occurrence of the rotation stepping.

The correction gain G_hosei may be calculated on the basis of a determination as to whether the rotation of the EPS motor 12 is stopped or decreased. In an example implementation, the target torque corrector 74 may check whether an amount of variation (e.g., an absolute value) in a motor rotation angle $\theta$m of the EPS motor 12, detected by the rotation angle sensor 23, is equal to or less than a set value. When the amount of variation in the motor rotation angle $\theta$m becomes equal to or less than the set value, the EPS motor 12 is determined as involving the occurrence of the rotation stepping. Further, the target torque corrector 74 may count the number of times that the amount of variation in the motor rotation angle $\theta$m becomes equal to or less than the set value by means of a counter (referred to as a "stepping determining counter"), and may set the correction gain G_hosei on the basis of a value of the stepping determining counter and by means of a torque correction gain table illustrated by way of example in FIG. 3.

Figure 3:
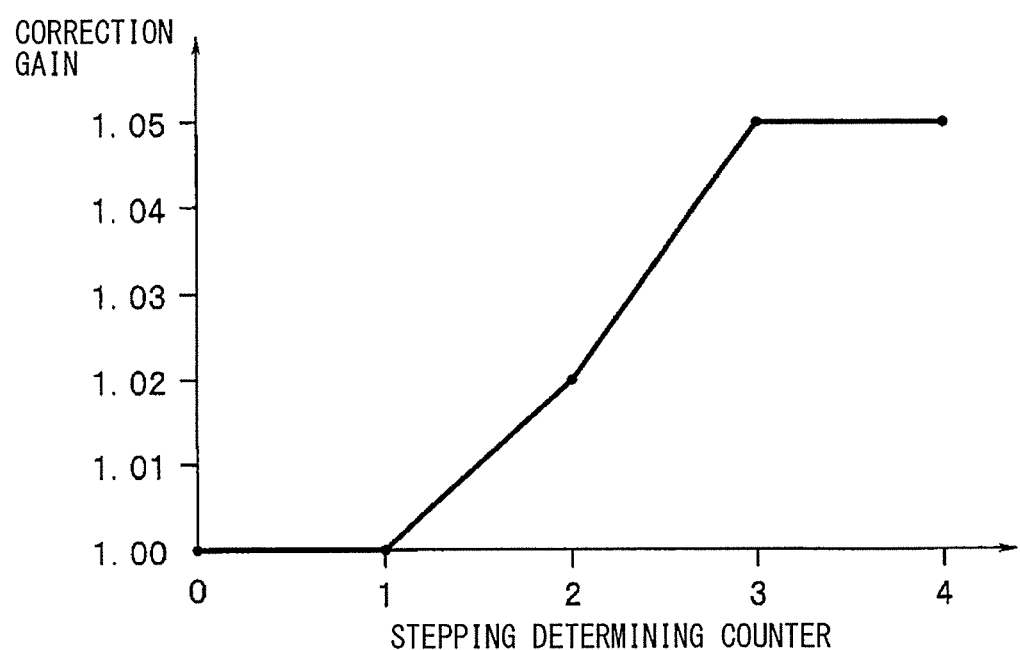
FIG. 3 is a diagram describing an example of a characteristic of a torque-correction gain table.

In an example implementation, the torque correction gain table illustrated by way of example in FIG. 3 may be so set as to have a property that the correction gain G_hosei is set to 1.00 (i.e., no correction is made) when the value of the stepping determining counter is 1 (one), and that the target torque Tp is so corrected as to be increased when the value of the stepping determining counter is equal to or greater than 2. FIG. 3 illustrates an example implementation in which the torque correction gain table is so set as to have a property that the correction gain G_hosei is set to 1.02 when the value of the stepping determining counter is 2, and that the correction gain G_hosei is set to 1.05, i.e., the maximum correction is made, when the value of the stepping determining counter is equal to or greater than 3.

The stepping determining counter may count, for each control cycle, the number of times that the amount of variation in the motor rotation angle θm becomes equal to or less than the set value, on a condition that: there is no steering override performed by the driver; and the target torque is equal to or greater than a predetermined value and the amount of variation in the target torque is equal to or greater than a predetermined value. The correction gain G_hosei, set on the basis of the value of the stepping determining counter, may be held by a stepping-determination non-established counter that counts the number of times that the amount of variation in the motor rotation angle θm becomes greater than the set value. The stepping-determination non-established counter is described later in greater detail.

Figure 4:
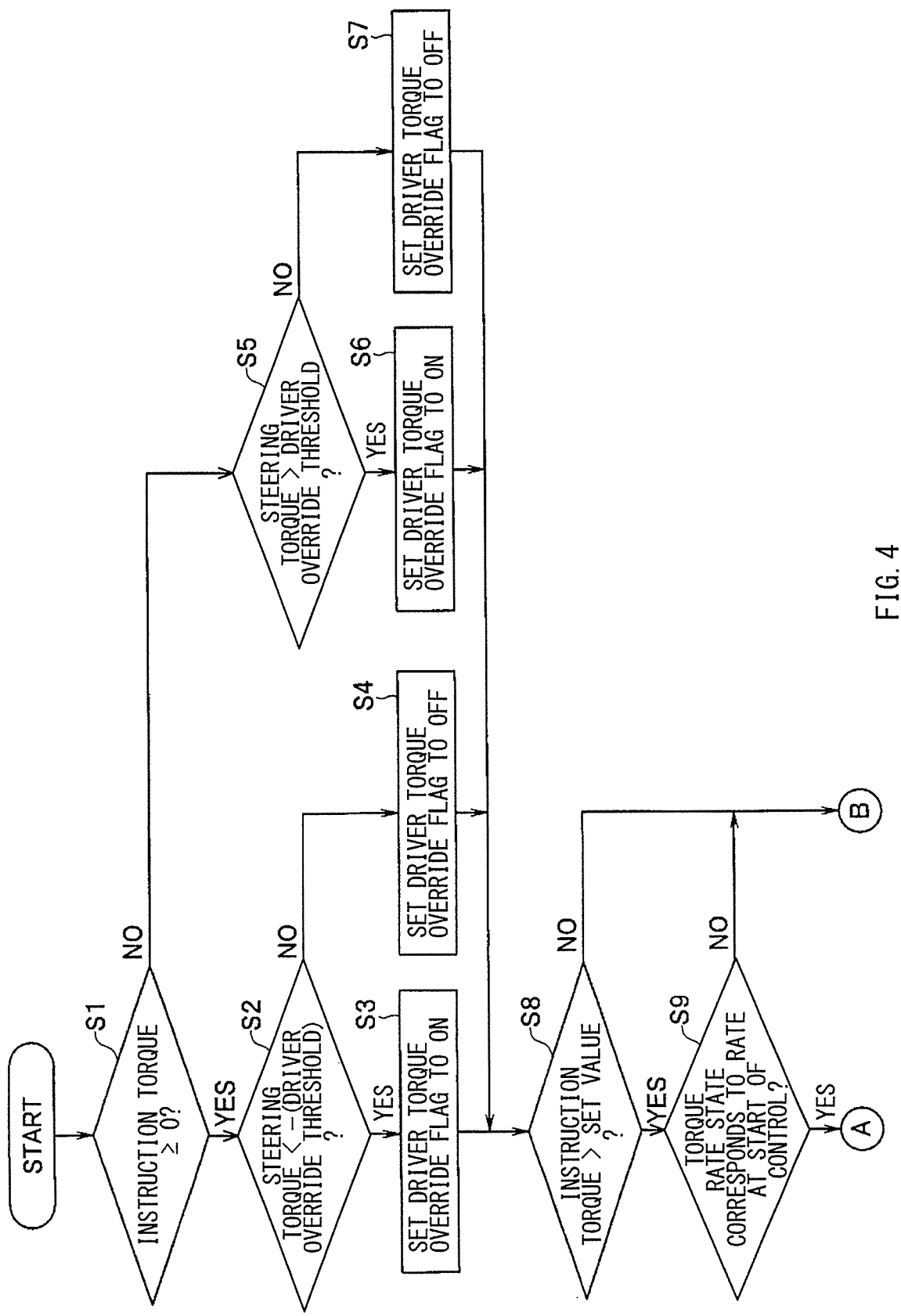
FIG. 4 is a flowchart illustrating an example of a part of a requested torque calculation routine.
Figure 5:
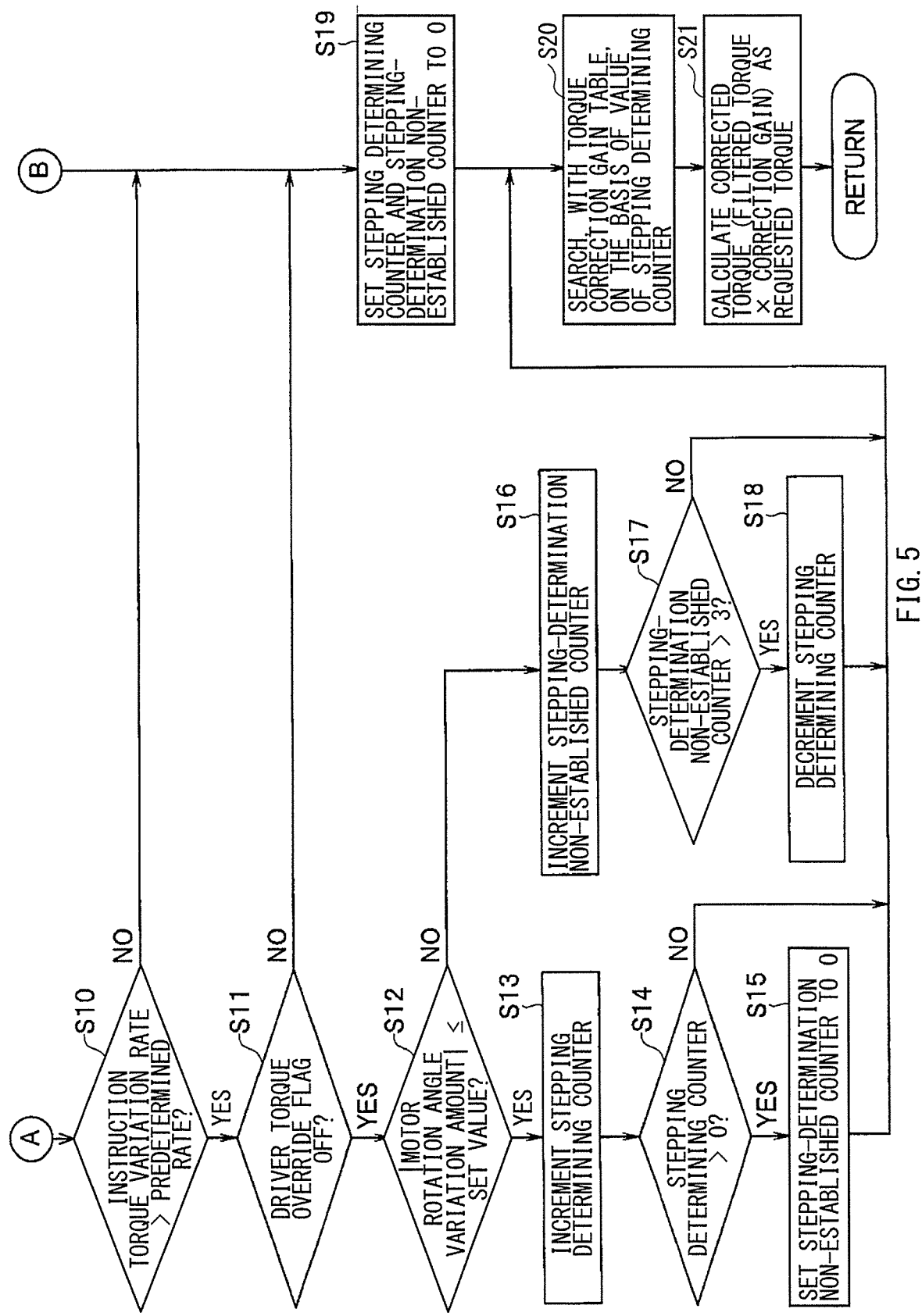
FIG. 5 is another flowchart illustrating an example of a part of the requested torque calculation routine.

A description is given next, with reference to a flowchart of a requested torque calculation routine illustrated by way of example in FIGS. 4 and 5, of a program process directed to calculation of the requested torque. The program process may be executed by the above-described steering control apparatus 50.

In step S1, the request torque calculation routine may first involve checking a sign, or a polarity, of current instruction torque T1, following which a determination may be made, in step S2 and after, as to whether there is an input of steering torque which is performed by the driver in a direction opposite to a direction of the instruction torque T1 and which exceeds a threshold. One reason for this is to prevent making the determination that the EPS motor 12 involves the occurrence of the rotation stepping when the rotation of the EPS motor 12 is stopped by the steering performed by the driver during execution of a control and thereby to prevent the correction of the stepping from being performed in a direction that interferes with the operation performed by the driver.

To address this, whether the current instruction torque T1 is equal to or greater than 0 (zero) (T1≥0) may be checked in step S1. When the current instruction torque T1 is equal to or greater than 0 (T1≥0) in step S1 (S1: YES), a flow may proceed to step S2 from step S1. In step S2, steering torque Tsteer may be compared with a negative value (−Th) of a threshold Th. The steering torque Tsteer may be steer torque derived from the steering performed by the driver and detected by the torque sensor 22. For example, the threshold Th, i.e., a driver override threshold Th, may be set to about 0.6 Nm. A determination may be made that the driver's steering override is performed and the correction of the stepping may be stopped accordingly as described later, when the torque that is opposite in sign to the instruction torque (i.e., torque that acts in a direction reverse to a turning direction) and exceeds the driver override threshold Th is inputted as the steering torque.

When the steering torque Tsteer is less than the negative value (−Th) of the driver override threshold Th (Tsteer<−Th) in step S2 (S2: YES), the flow may proceed to step S3 from step S2. In step S3, a driver torque override flag Fdry may be set to ON, following which the flow may proceed to step S8. When the steering torque Tsteer is equal to or greater than the negative value (−Th) of the driver override threshold Th (Tsteer≥−Th) in step S2 (S2: NO), the flow may proceed to step S4 from step S2. In step S4, the driver torque override flag Fdry may be set to OFF, following which the flow may proceed to step S8.

The driver torque override flag Fdry may indicate presence or absence of the steering override performed by the driver. For example, the driver torque override flag Fdry may indicate that the driver's steering override is present when the driver torque override flag Fdry is set to ON, e.g., when the driver torque override flag Fdry is 1 (one) (Fdrv=1). For example, the driver torque override flag Fdry may indicate that the driver's steering override is absent when the driver torque override flag Fdry is set to OFF, e.g., when the driver torque override flag Fdry is 0 (zero) (Fdrv=0).

When the current instruction torque T1 is less than 0 (T1<0) in step S1 (S1: NO), the flow may proceed to step S5 from step S1. In step S5, the steering torque Tsteer may be compared with the positive driver override threshold Th. When the steering torque Tsteer is greater than the positive driver override threshold Th (Tsteer>Th) in step S5 (S5: YES), the flow may proceed to step S6 from step S5. In step S6, the driver torque override flag Fdry may be set to ON, following which the flow may proceed to step S8. When the steering torque Tsteer is equal to or less than the positive driver override threshold Th (Tsteer≤Th) in step S5 (S5: NO), the flow may proceed to step S7 from step S5. In step S7, the driver torque override flag Fdry may be set to OFF, following which the flow may proceed to step S8.

Steps S8 to S11 may be directed to a determination as to whether a condition of performing the correction of the stepping for the target torque is satisfied. First, in step S8, whether the instruction torque is greater than a predetermined set value may be checked. The set value may be a torque value by which the fluctuation in the torque of the pinion shaft 5 possibly occurs due to driving of the steering mechanism by the relatively high torque. For example, the set value may be 20 Nm.

When the instruction torque is greater than the set value in step S8 (S8: YES), the flow may proceed to step S9 from step S8. In step S9, whether a state of variation in the torque, i.e., a torque rate state, corresponds to a rate at the start of the control may be checked. When the torque rate state corresponds to the rate at the start of the control (S9: YES), the flow may proceed to step S10 from step S9. In step S10, whether a rate of variation in the instruction torque is greater than a predetermined rate may be checked. The rate of variation in the instruction torque may be calculated on the basis of a difference of the instruction torque per cycle of the control cycle. For example, the predetermined rate may be 10 Nm/sec. When the rate of variation in the instruction torque based on the difference is greater than the predetermined rate (S10: YES), the flow may proceed to step S11 from step S10. In step S11, whether the driver torque override flag Fdry is set to OFF may be checked.

The condition of performing the correction of the stepping may be determined as being satisfied and the flow may proceed to step S12 accordingly when all of the conditions of respective steps S8 to S11 are satisfied. In other words, the flow may proceed to step S12 when all of the following conditions are satisfied: the condition in which the instruction torque is greater than the set value of step S8; the condition in which the torque rate state corresponds to the rate at the start of the control of step S9; the condition in which the rate of variation in the instruction torque is greater than the predetermined rate of step S10; and the condition in which the driver torque override flag Fdry is set to OFF. When any of the conditions of respective steps S8 to S11 is not satisfied, the condition of performing the correction of the stepping may be determined as being not satisfied and the flow may proceed to step S19 from corresponding step accordingly. In step S19, both the stepping determining counter and the stepping-determination non-established counter may be reset to zero, following which the flow may proceed to later-described step S20.

In step S12, whether the amount of variation (e.g., the absolute value) in the motor rotation angle θm of the EPS motor 12 is equal to or less than the set value may be checked. In an example implementation, an absolute value |Δθm| of a difference of the motor rotation angle θm per cycle of the control cycle may be calculated as a motor rotation angle variation amount |Δθm|. Further, the motor rotation angle variation amount |Δθm| may be compared with a positive set value θth. For example, the set value θth may be 2.5 deg.

When the motor rotation angle variation amount |Δθm| is equal to or less than the set value θth in step S12 (S12: YES), the EPS motor 12 may be determined as involving the occurrence of the stepping and the flow may proceed to step S13 from step S12 accordingly. In step S13, the stepping determining counter may be incremented. Thereafter, whether the stepping determining counter is greater than 0 (zero) may be checked in step S14. The flow may proceed to step S15 from step S14 when the stepping determining counter is greater than 0 in step S14 (S14: YES). In other words, the flow may proceed to step S15 from step S14 when a state in which the motor rotation angle variation amount |Δθm| is equal to or less than the set value θth continues and thereby the stepping determining counter is incremented successively. In step S15, the stepping-determination non-established counter may be reset to zero, following which the flow may proceed to later-described step S20.

When the motor rotation angle variation amount |Δθm| is greater than the set value θth in step S12 (S12: NO), the EPS motor 12 may be determined as not involving the occurrence of the stepping and the flow may proceed to step S16 from step S12 accordingly. In step S16, the stepping-determination non-established counter may be incremented. For example, the stepping-determination non-established counter may be incremented up to a maximum value of the stepping-determination non-established counter depending on a condition. For example, the maximum value may be 255.

Thereafter, the flow may proceed to step S17 from step S16. In step S17, whether the stepping-determination non-established counter is greater than the set value may be checked. In an example implementation, whether the stepping-determination non-established counter is greater than the set value of three may be checked. When the stepping-determination non-established counter is greater than the set value, e.g., greater than 3 (S17: YES), the flow may proceed to step S18 from step S17. In step S18, the stepping determining counter may be decremented, following which the flow may proceed to step S20. When the stepping-determination non-established counter is not greater than the set value, e.g., not greater than 3 (S17: NO), the flow may proceed to step S20 with the value of the stepping determining counter being maintained.

In step S20, the correction gain G_hosei may be searched on the basis of the value of the stepping determining counter and by means of the torque correction gain table, following which the flow may proceed to step S21. In step S21, the target torque Tp, having been subjected to the filtering process by the rate limiter 73 (i.e., filtered torque), may be corrected on the basis of the correction gain G_hosei, to thereby calculate the corrected torque (i.e., Tp×G_hosei) as the requested torque. The thus-calculated requested torque may be supplied to the final rate limiter 75, and the final rate limiter 75 may output the requested torque as the instruction torque T1.

Figure 6:
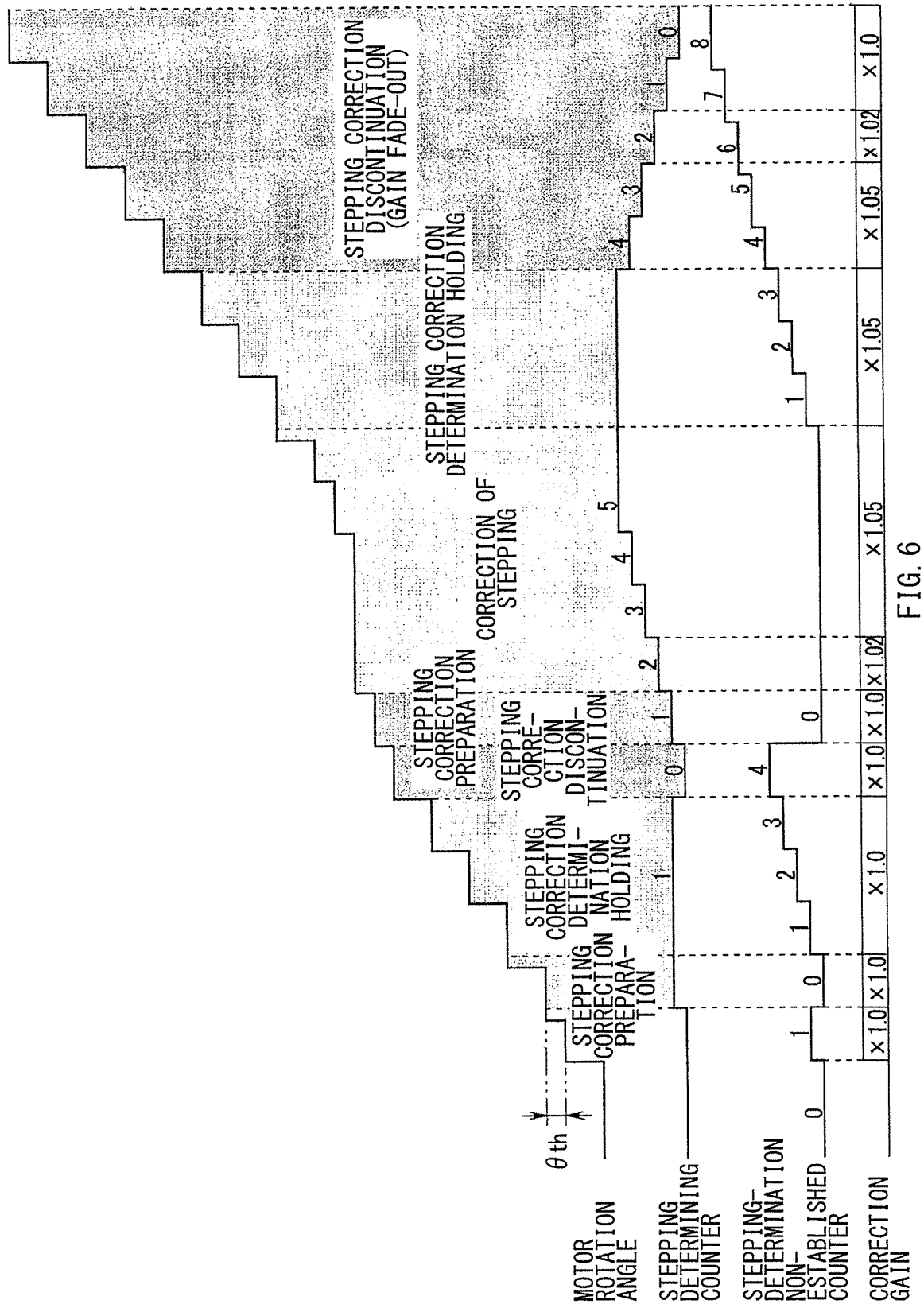
FIG. 6 is a diagram describing an example of an operation of determining stepping.

A description is given next, with reference to FIG. 6, of an example of an operation of determining the stepping. The exemplary operation of determining the stepping illustrated in FIG. 6 utilizes the foregoing example processes. First, preparation for the correction of the stepping (referred to as "stepping correction preparation") may be performed when the motor rotation angle variation amount |Δθm| exceeds the set value θth and the stepping determining counter is incremented from 0 (zero) to 1 (one) accordingly. It is to be noted that the correction gain G_hosei here may be 1.00 and thus the correction of the torque may not be performed substantially.

Thereafter, in one example illustrated in FIG. 6, when the motor rotation angle variation amount |Δθm| exceeds the set value θth in succession, the stepping determining counter may be held to 1 (one) as it is and the stepping-determination non-established counter may be incremented from 1 to 2 and so forth (referred to as "stepping correction determination holding"). Under such circumstances, when the stepping-determination non-established counter exceeds 3, the correction of the stepping may be discontinued and the stepping determining counter may be reset to 0 (zero) (referred to as "stepping correction discontinuation"). In this case, the stepping-determination non-established counter may also be reset to 0 (zero) and the stepping correction preparation may be performed in the subsequent control cycle.

Thereafter, in one example illustrated in FIG. 6, when the motor rotation angle variation amount |Δθm| does not exceed the set value θth in succession, the stepping determining counter may be incremented from 0 to 1, 1 to 2, 2 to 3, and so forth. In this case, the correction gain G_hosei may be set to 1.02 and thus the correction of the torque may be performed once the stepping determining counter becomes 2. For example, the correction gain G_hosei may be set to 1.05 and the maximum correction of the torque may be performed accordingly when the stepping determining counter becomes 3 or more.

When the motor rotation angle variation amount |Δθm| exceeds the set value θth as a result of the correction of the torque based on the correction gain G_hosei and the stepping-determination non-established counter is incremented from 0 (zero) to 1 (one), the number of count of the stepping determining counter may be held and the correction gain G_hosei corresponding to the held number of count of the stepping determining counter may be held accordingly (referred to as "stepping correction determination holding"). FIG. 6 illustrates an example case where the stepping determining counter is kept to 5 and the correction gain G_hosei is thus held to 1.05.

It is to be noted that the correction of the stepping is not discontinued immediately when the stepping-determination non-established counter is incremented from 0 (zero) during the execution of the correction based on the correction gain G_hosei. In an example implementation, the stepping determining counter may be decremented sequentially in accordance with the increment in the stepping-determination non-established counter, and the correction of the stepping may be discontinued eventually following the sequential decrement in the stepping determining counter. In other words, the correction may be so discontinued that a gain fade-out is achieved in which the correction gain becomes smaller gradually.

Figure 7:
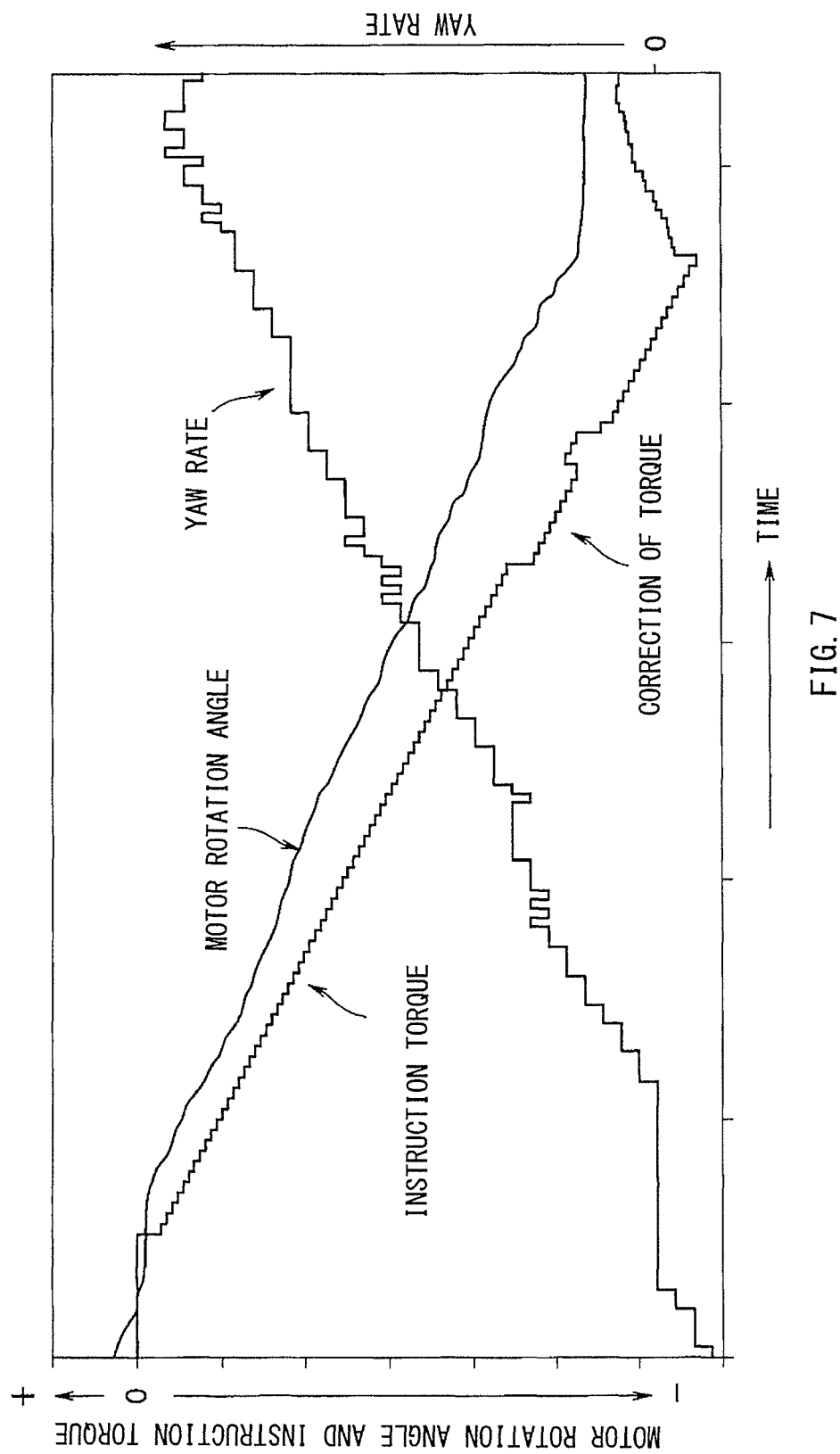
FIG. 7 is a diagram describing an example of a variation in motor rotation angle and a variation in yaw rate both upon turning.

Accordingly, referring to FIG. 7, it is possible to suppress or prevent the occurrence of the stepping that involves the stop or the decrease in the EPS motor 12 owing to the correction of the torque, when the instruction torque that varies at a constant rate is outputted to the EPS motor 12 upon the turning of the vehicle. Hence, it is possible to prevent a stop of the variation in the yaw rate or a decrease in the variation in the yaw rate, and thereby to achieve a stable vehicle behavior. Note that FIG. 7 illustrates an example case where a direction of minus of each of the motor rotation angle and the instruction torque corresponds to a direction that is opposite to the side on which the vehicle departs from the lane. In this case, the torque may be so corrected as to be increased when the instruction torque is corrected towards the minus side, suppressing or preventing the occurrence of the rotation stepping of the EPS motor 12.

According to the foregoing example implementation, the correction gain G_hosei directed to the target torque Tp is calculated and the target torque Tp is corrected with the correction gain G_hosei to thereby cause the target torque Tp to be increased, when controlling the steering angle by means of the electric power steering device 1 and on a condition that the rotation angle variation amount becomes equal to or less than the set value. In other words, the correction process is performed that calculates the correction gain G_hosei directed to the target torque Tp and corrects, with the correction gain G_hosei, the target torque Tp to thereby cause the target torque Tp to be increased. The correction process is performed when an instruction value, i.e., the value of the instruction to be given to the EPS motor 12 and based on the target torque Tp, is varied at a constant rate and on a condition that the absolute value of the motor rotation angle variation amount of the EPS motor 12 becomes equal to or less than the set value. Hence, it is possible to suppress or prevent the rotation stepping resulting from the fluctuation in efficiency of transferring the torque from the EPS motor 12 to the steering mechanism and thereby achieve an intended vehicle behavior, e.g., a vehicle behavior that follows the target yaw rate.

The steering control apparatus 50 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering control apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering control apparatus 50 illustrated in FIGS. 1 and 2.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A steering control apparatus of a vehicle, the steering control apparatus comprising:
   a target yaw rate calculator configured to calculate a target yaw rate, the target yaw rate allowing the vehicle to travel along a traveling course that is set on a basis of external environment information and traveling information of the vehicle, the vehicle being able to control a steering angle by driving, with an electric motor, a steering mechanism;
   a target torque calculator configured to calculate target torque, the target torque being torque of the electric motor and allowing the target yaw rate to be generated; and
   a target torque corrector configured to perform a correction process, the correction process calculating a correction gain directed to the target torque and correcting, with the correction gain, the target torque to thereby cause the target torque to be increased, the target torque corrector being configured to perform the correction process when an instruction value output to the electric motor varies at a constant rate and on a condition that an absolute value of a motor rotation angle variation amount becomes equal to or less than a set value, the instruction value determined by a rate limiter based on the target torque, the motor rotation angle variation amount being an amount of variation in rotation angle of the electric motor.

2. The steering control apparatus of vehicle according to claim 1, wherein the target yaw rate allows a target turning amount to be obtained, the target turning amount being a target amount of turning of the vehicle and preventing departure of the vehicle from a lane along which the vehicle travels.

3. The steering control apparatus of vehicle according to claim 2, wherein the target torque corrector refrains from performing the correction process when a steering input that exceeds a threshold is received, the steering input being an input of steering of the steering mechanism performed by a driver and being in a direction opposite to a direction of steering of the steering mechanism performed by the electric motor.

4. The steering control apparatus of vehicle according to claim 3, wherein the correction gain is set to cause an amount of the increase in the target torque to be larger on a basis of the number of times that the absolute value of the motor rotation angle variation amount of the electric motor becomes equal to or less than the set value when the instruction value of the electric motor is varied at the constant rate.

5. The steering control apparatus of vehicle according to claim 2, wherein the correction gain is set to cause an amount of the increase in the target torque to be larger on a basis of the number of times that the absolute value of the motor rotation angle variation amount of the electric motor becomes equal to or less than the set value when the instruction value of the electric motor is varied at the constant rate.

6. The steering control apparatus of vehicle according to claim 1, wherein the target torque corrector refrains from performing the correction process when a steering input that exceeds a threshold is received, the steering input being an input of steering of the steering mechanism performed by a driver and being in a direction opposite to a direction of steering of the steering mechanism performed by the electric motor.

7. The steering control apparatus of vehicle according to claim 6, wherein the correction gain is set to cause an amount of the increase in the target torque to be larger on a basis of the number of times that the absolute value of the motor rotation angle variation amount of the electric motor becomes equal to or less than the set value when the instruction value of the electric motor is varied at the constant rate.

8. The steering control apparatus of vehicle according to claim 1, wherein the correction gain is set to cause an amount of an increase in the target torque to be larger on a basis of a number of times that the absolute value of the motor rotation angle variation amount of the electric motor becomes equal to or less than the set value when the instruction value of the electric motor is varied at the constant rate.

9. A steering control apparatus of vehicle, the steering control apparatus comprising
 circuitry configured to
  control a steering angle by driving, with an electric motor, a steering mechanism,
  calculate a target yaw rate, the target yaw rate allowing a vehicle to travel along a traveling course that is set on a basis of external environment information and traveling information of the vehicle,
  calculate target torque, the target torque being torque of the electric motor and allowing the target yaw rate to be generated, and
 perform a correction process, the correction process calculating a correction gain directed to the target torque and correcting, with the correction gain, the target torque to thereby cause the target torque to be increased, the correction process being performed when an instruction value output to the electric motor varies at a constant rate and on a condition that an absolute value of a motor rotation angle variation amount becomes equal to or less than a set value, the instruction value determined by a rate limiter based on the target torque, the motor rotation angle variation amount being an amount of variation in rotation angle of the electric motor.

* * * * *